(12) United States Patent
Petard

(10) Patent No.: US 9,851,371 B2
(45) Date of Patent: Dec. 26, 2017

(54) METHOD FOR MEASURING THE KINEMATICS OF AT LEAST ONE TURBOMACHINE ROTOR

(71) Applicant: Safran Aircraft Engines, Paris (FR)

(72) Inventor: Benjamin Petard, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 15/128,069

(22) PCT Filed: Mar. 17, 2015

(86) PCT No.: PCT/FR2015/050636
§ 371 (c)(1),
(2) Date: Sep. 21, 2016

(87) PCT Pub. No.: WO2015/145022
PCT Pub. Date: Oct. 1, 2015

(65) Prior Publication Data
US 2017/0097374 A1    Apr. 6, 2017

(30) Foreign Application Priority Data

Mar. 27, 2014 (FR) ..................................... 14 52611

(51) Int. Cl.
*G01T 1/20* (2006.01)
*G01P 3/482* (2006.01)
*G01M 15/14* (2006.01)

(52) U.S. Cl.
CPC ............. *G01P 3/482* (2013.01); *G01M 15/14* (2013.01); *G01T 1/20* (2013.01)

(58) Field of Classification Search
CPC .................................. G01P 3/482; G01P 3/04
See application file for complete search history.

(56) References Cited

U.S. PATENT DOCUMENTS

| 2,683,813 A | 7/1954 | Friedman |
| 2,692,951 A | 10/1954 | Voelker |
| 2,996,620 A * | 8/1961 | Bockemuehl ............. G01P 3/56 250/303 |
| 3,012,144 A | 12/1961 | Martin |

(Continued)

FOREIGN PATENT DOCUMENTS

| FR | 2 010 785 A1 | 2/1970 |
| FR | 2 178 060 A1 | 11/1973 |
| NL | 9200161 | * 7/1993 |

OTHER PUBLICATIONS

Derwent translation of NL 9200161.*

(Continued)

*Primary Examiner* — Yara B Green
(74) *Attorney, Agent, or Firm* — Christensen O'Connor Johnson Kindness PLLC

(57) ABSTRACT

The invention relates to a method for measuring the kinematics of at least one rotor of an engine (14), especially a turbomachine, characterized in that the measurement is performed by gamma ray scintigraphy, the method comprising steps consisting in providing the rotor with radioactive tracers, and, during the operation of the engine, detecting the gamma rays emitted by said tracers by means of at least two gamma cameras (30).

12 Claims, 2 Drawing Sheets

(56) References Cited

U.S. PATENT DOCUMENTS

| | | | | |
|---|---|---|---|---|
| 2009/0058676 A1* | 3/2009 | Orlosky | ................ | G01D 4/004 340/870.02 |
| 2013/0247576 A1* | 9/2013 | Myhre | .................... | F23N 5/08 60/772 |
| 2015/0248275 A1* | 9/2015 | Gallo | ....................... | G01T 7/00 702/189 |

OTHER PUBLICATIONS

Written Opinion dated Oct. 1, 2015, issued in corresponding International Application No. PCT/FR2015/050636, filed Mar. 17, 2015, 7 pages.

International Search Report dated Jun. 26, 2015, issued in corresponding International Application No. PCT/FR2015/050636, filed Mar. 17, 2015, 5 pages.

* cited by examiner

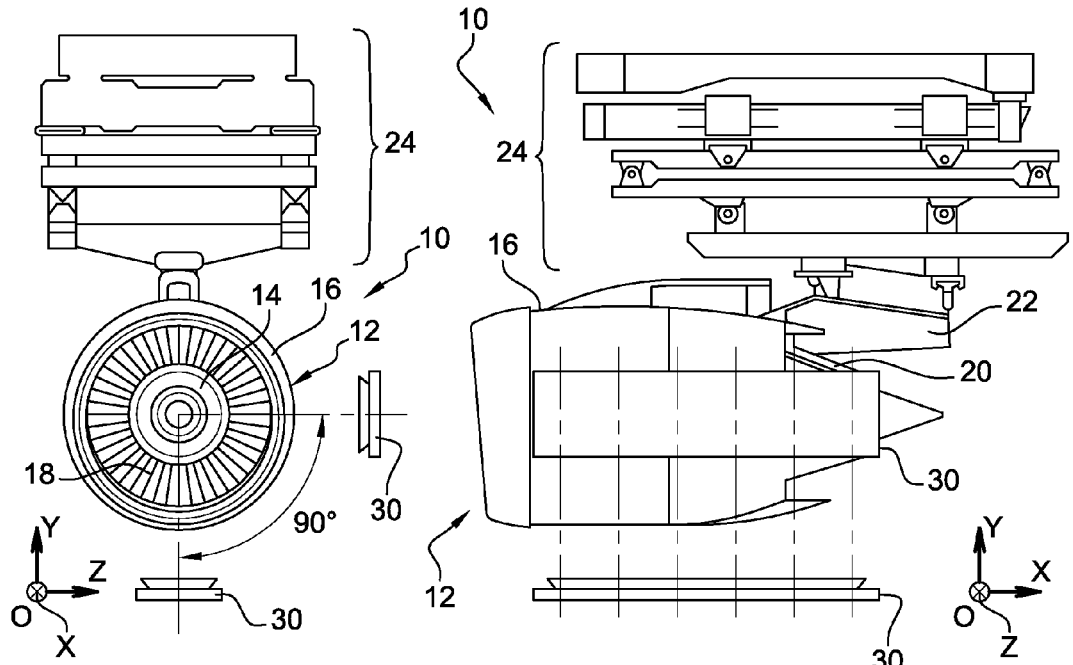
Fig. 1A  Fig. 1B
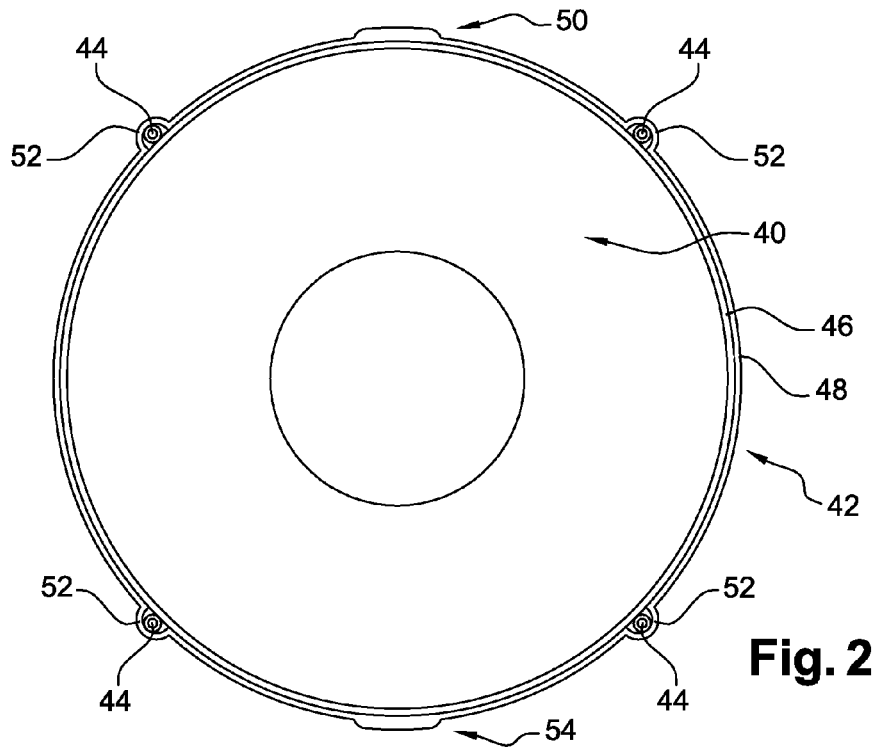
Fig. 2

METHOD FOR MEASURING THE KINEMATICS OF AT LEAST ONE TURBOMACHINE ROTOR

TECHNICAL FIELD

The present invention relates to a method for measuring the kinematics of at least one rotor of an engine, in particular of a turbine engine.

PRIOR ART

The tests of a turbine engine are carried out either on a rig or in the open air and can be partial or not, i.e. they can involve the entire turbine engine or only a part thereof, such as one of the modules thereof.

One of the objectives of the tests is to collect information about the actual behaviour of the turbine engine or of one of the modules thereof. Thus, the different physical parameters which are relevant for describing the operation of the turbine engine are to be acquired.

The instrumentation technologies and techniques are very diverse in order to measure the physical quantities which govern a turbine engine. However, there are still quite a few difficulties involved in observing the mechanical behaviour of fundamental engine parts.

The main objectives of the overall dynamics are to study the dynamic phenomena which determine the architecture of a turbine engine in order to define the loads which are applicable to each of the parts thereof.

The phenomena which are of particular interest to persons skilled in the art of the overall dynamics include the study of the kinematics of the low- and high-pressure rotors. The kinematics of the rotors comprise the movements of the rotors in space, the rotational speeds thereof, etc. When a significant imbalance appears due to the loss of a fan blade (of the FBO type, the abbreviation of "fan blade out"), the eccentricity of the low-pressure rotor produces most of the loads which pass into the stator. Said loads must thus be taken into account for the size of the stator. The eccentricity of the rotor thus determines the overall mass of the architecture of the turbine engine.

More specifically, for engine architectures involving deliberate destruction of a low-pressure compressor as a result of buckling during a loss of a blade, it is difficult nowadays to ascertain the precise kinematics of said compressor. However, a significant parameter such as the radial incursion speed of a low-pressure compressor during off-centring of the rotor opposite said compressor determines the buckling moments and the buckling loads of the guide vane assemblies and of the movable impellers thereof. As a result, this determines the loads which pass into the inter-duct casing and the intermediate casing: the later the low-pressure compressor buckles, the more loads that pass into the casings, and the more the mass of the stator increases to support them. Currently, the poor understanding of the kinematics of the low-pressure compressor, due to a lack of effective means for measuring said kinematics, leads to quite a few conservatisms when designing a turbine engine. These conservatisms lead to an overestimation of the buckling loads, thus to a local oversizing of the stator and ultimately to an increase in the mass of the turbine engine.

Other phenomena can cause an imbalance, such as during endurance tests of the engine. In this case, imbalances can appear due to the wear of the parts. The imbalance which is related to a loss of a fan blade, however, is the most important factor for the stator of a turbine engine.

A good understanding and a good knowledge of the dynamic behaviour of a turbine engine rotor during a loss of a blade are thus very important when designing an engine.

Currently, there are only very limited technical solutions for measuring the kinematics of a rotor in a test, with digital models as the only option for simulating said kinematics without resetting to actual data. In addition, the presence of a stator obscures a direct view of the rotating parts and a fortiori prevents direct measurement of the shaft line in one or more planes. A stator, which is provided with electronic equipment (such as the FADEC, the abbreviation of "full authority digital engine control"), also makes it difficult to put in place a wired acquisition system or to use magnetic sensors, involving the use of a magnetic field.

The present invention proposes a solution to these problems, in order to effectively measure, in a test, the kinematics of a rotor when an obscuring stator is present, in particular of a turbine engine.

SUMMARY OF THE INVENTION

The present invention proposes a method for measuring the kinematics of at least one rotor of an engine, in particular of a turbine engine, characterised in that the measurement is carried out by means of scintigraphy using gamma radiation, the method comprising the steps consisting in:

a) equipping the rotor with radioactive tracers, and
b) during the operation of the engine, detecting the gamma radiation emitted by said tracers by means of at least two gamma cameras which are oriented substantially at 90° to one another.

The invention thus proposes measuring in particular the movements of the rotor by means of scintigraphy using gamma radiation. This technique is based on detecting radioactive isotopes, which are referred to as radioactive tracers, the gamma radiation of which can be captured and displayed by one or more gamma cameras. The defining feature of gamma radiation, by contrast with alpha and beta radiation, is the strong aptitude thereof for penetrating significant thicknesses of metal such as those characterising the casings and the nacelle of a turbine engine or of a propulsion system.

The invention can be applied generally to any type of engine, and to any measurement of kinematics of a rotating part of the engine which can be visually obscured by a fixed or rotating part (for example of a high-pressure rotor obscuring a low-pressure rotor).

The technology proposed for measuring the kinematics of at least one engine rotor is particularly advantageous because it is compact, it does not have the problems which are inherent to the wired acquisition technologies from the prior art, and it makes it possible to eliminate the problem of the presence of a(n obscuring) stator covering the rotor. The radioactive tracers are not in fact connected to an acquisition system, and are resistant to shocks and to accelerations and decelerations (several thousand revolutions per minute).

The method according to the invention can for example be used during the development of an engine, in particular of a turbine engine. Familiarity with the relative movement over time between low- and high-pressure rotors of the engine would make it possible for example to consolidate knowledge of the phenomena of inter-shaft contact (extent of contact, effective contact period, etc.) and of heating during a loss of a blade. These events can be the subject of events which are monitored for the sizing of the turbine shaft (which are now simulated only by calculation). It would also make it possible to monitor the inter-shaft clearances in normal operation in order to inspect the portions which are useful for the ventilation of the space between shafts. The absolute measurement of the radial deflection of the shaft line in all directions would also provide clarifications about the temporary flexure which the low-pressure shaft undergoes during a loss of a fan blade. Among other factors, said flexure determines the sizes of the inter-shaft clearances.

According to one embodiment of the invention, in step a), the rotor is equipped with at least one ring for supporting a plurality of radioactive tracers, said ring extending around the axis of rotation of the rotor and being connected to the rotor for conjoint rotation.

A rotor can be equipped with a plurality of said rings, which are distributed over the full extent of the line of the rotor. This makes it possible for example to measure the deformations of a turbine engine rotor, over the range of deceleration during a loss of a fan blade.

The radioactive tracers of the ring or of each ring are preferably regularly distributed around said ring. This makes it possible to limit the risk of an imbalance appearing in operation. The ring or each ring can comprise at least two, and for example four, radioactive tracers. There can be as many tracers as desired, which are preferably regularly distributed. A compromise must be found between the cost of the device and the precision of the measurements. The ring or each ring preferably comprises an even number of tracers in order to reduce the risks of an imbalance appearing. Said tracers are preferably in diametrically opposed pairs.

In one specific embodiment of the invention, the ring or each ring comprises an outer annular layer made of metal and an inner annular layer made of elastically deformable material. The inner layer makes it possible to prevent any relative rotational or axial movement between the rotor and the ring, in particular during a sharp deceleration of the engine speed which occurs for example after a loss of a fan blade.

This type of ring is relatively light and compact. Said ring can have an axial dimension of approximately a few millimeters and a thickness of approximately a few millimeters.

Advantageously, the metal layer is split or open at a point on the circumference thereof and comprises closure means in the region of the free circumferential ends thereof.

The metal layer can have an oversized portion which is diametrically opposite the closure means. Advantageously, this oversized portion is sized so that the mass thereof is substantially equal to that of the closure means, in such a way that the oversized portion acts as a compensating mass which is intended to limit the risk of an imbalance appearing during use.

Advantageously, the metal layer defines recesses for receiving the radioactive tracers. The inner layer preferably extends between the rotor and the radioactive tracers so as to constrain said tracers in the recesses in the metal layer.

The present invention also relates to an installation for implementing the method as described above, characterised in that it comprises means for supporting an engine, in particular of a turbine engine, such as a test rig, at least two gamma cameras which are oriented substantially in planes which are substantially horizontal and vertical respectively, and radioactive tracers which are mounted or intended to be mounted on a rotor of the turbine engine.

The two gamma cameras make it possible to follow the movement of the midpoint of the gamma ray in the vertical and horizontal planes and to thus obtain two components of a motion vector (a first component in the vertical plane and a second component in the horizontal plane). The arrangement of the two camera planes may make it necessary to preserve an angle of 90° between the observation planes in order to be able to easily recombine the two components and to effectively recreate the kinematics of the rotor in space as a function of time (module of the two components).

DESCRIPTION OF THE DRAWINGS

The invention will be better understood, and other details, features and advantages of the invention will become apparent upon reading the following description, given by way of non-limiting example with reference to the accompanying drawings, in which:

FIGS. 1A and 1B are schematic, perspective views of an installation for implementing the method according to the invention, from the front and from the side respectively, FIG. 2 is a very schematic front view of a rotor which is equipped with a ring for supporting radioactive tracers.

DETAILED DESCRIPTION

Figure 3:
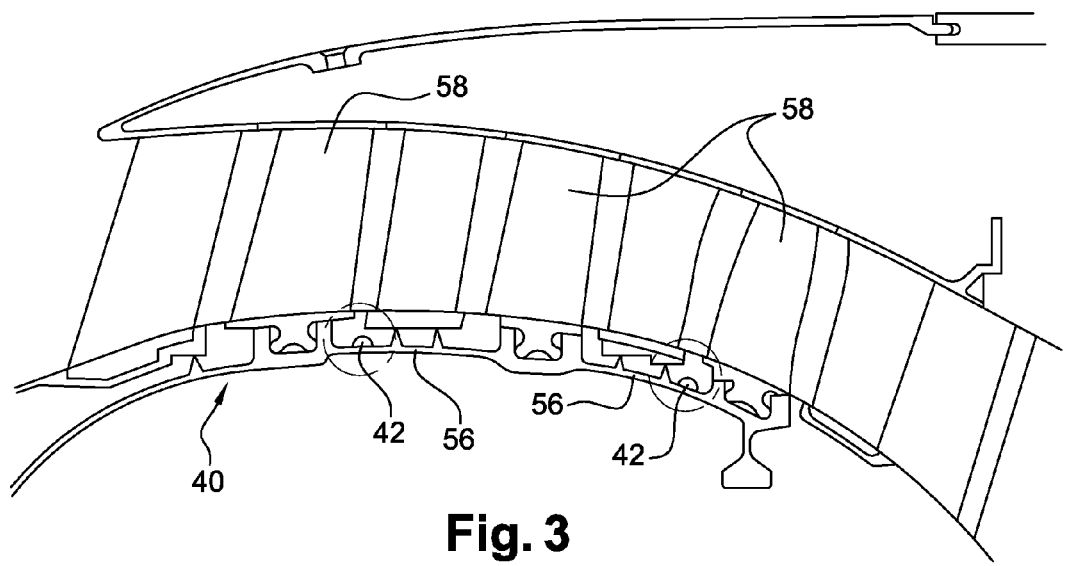
FIGS. 3 and 4 are schematic axial sectional half views of parts of a turbine engine, and show areas for assembling the support rings.

Reference is firstly made to FIGS. 1A and 1B, which show an installation 10 for implementing the method according to the invention for measuring the kinematics of a rotor of an engine, which in this case is an engine of a propulsion system 12.

Conventionally, a propulsion system comprises an engine 14 of a turbine engine which is surrounded by a nacelle 16. The engine 14 comprises, from upstream to downstream, in the direction of flow, a fan 18, at least one compressor, a combustion chamber, at least one turbine and a pipe 20 for ejecting combustion gases. The propulsion system 12 is to be connected to a structural element of an aircraft, such as a wing or the fuselage thereof, by means of a strut 22 which is rigidly connected to the engine 14.

In the case of a turbine engine or a bypass turbojet engine, the engine 14 defines a first annular flow duct for a primary flow or hot flow, and the nacelle 16 defines, around the engine 14, an annular flow duct for a secondary flow or cold flow. The air flow entering the air inlet of the nacelle 16 divides downstream of the fan 18 to form the abovementioned primary and secondary air flows.

The engine 14 comprises at least one rotating body which comprises a shaft for connecting a turbine rotor to a compressor rotor. In the case of a multi-body turbine engine, the engine comprises a low-pressure (LP) body which comprises a LP shaft for connecting a LP turbine rotor to a LP compressor rotor, and a high-pressure (HP) body which comprises a HP shaft for connecting a HP turbine rotor to a HP compressor rotor.

As explained previously, the invention makes it possible to measure the kinematics of a rotor of the engine, such as the LP body thereof. In technologies from the prior art, the LP body of an engine of a turbine engine is considered to be obscured by the stator and in part by the HP body. The invention makes it possible to solve this problem by measuring the kinematics of the rotor by means of scintigraphy using gamma radiation, the gamma radiation being capable of penetrating significant thicknesses of metal such as those of the HP body, of the stator casings and of the nacelle of the propulsion system 12.

The installation 10 for implementing the method according to the invention in this case comprises means 24 for supporting the propulsion system 12, which in this case is in the form of a test rig. Said rig in this case comprises means for fixing to the strut 22 of the propulsion system 12, in order to suspend said propulsion system.

The installation 10 further comprises at least one gamma camera 30 and radioactive tracers (not shown in FIGS. 1A and 1B) which are mounted on the rotor of the engine 14, i.e. on the LP body in the above-mentioned example.

In the example shown, the installation 10 comprises two gamma cameras 30, which are oriented at 90° with respect to one another. A first (lateral) gamma camera 30 is arranged in a substantially horizontal plane on one side of the propulsion system 12, i.e. at 3 o'clock or 9 o'clock using the analogy of the dial of a clock, and a second (lower) gamma camera 30 is arranged in a substantially vertical plane under the propulsion system 12, i.e. at 6 o'clock.

In a known manner, a gamma camera 30 is a scintillation camera which comprises in particular a scintillator material-based screen which is arranged between a collimator and photomultipliers which are connected to an electronic circuit.

The lateral camera 30 is planar, the plane of the camera being substantially perpendicular to a horizontal plane passing through the longitudinal axis of the propulsion system 12. Said lateral camera makes it possible to measure the kinematics of the rotor in a substantially vertical plane (plane xoy). The lower camera 30 is also planar, the plane of said camera 30 being substantially perpendicular to a substantially vertical plane passing through the longitudinal axis of the propulsion system 12. Said camera makes it possible to measure the kinematics of the rotor in a substantially horizontal plane (plane xoz).

In this case, the cameras 30 are fixed and preferably extend over the majority of the length of the propulsion system 12. The greater the sizes of the cameras 30, the more capable they are of detecting gamma radiation and thus movements of the rotor because said radiation only reaches the screen of scintillator material if it is oriented perpendicularly to said screen (otherwise it would not be transmitted through the collimator).

The two gamma cameras 30 are connected to a unit (not shown) for acquiring and processing data emitted by the electronic circuits of said cameras, in order to measure the kinematics of the rotor, and in particular to measure the amplitude of the movements thereof.

Figure 4:
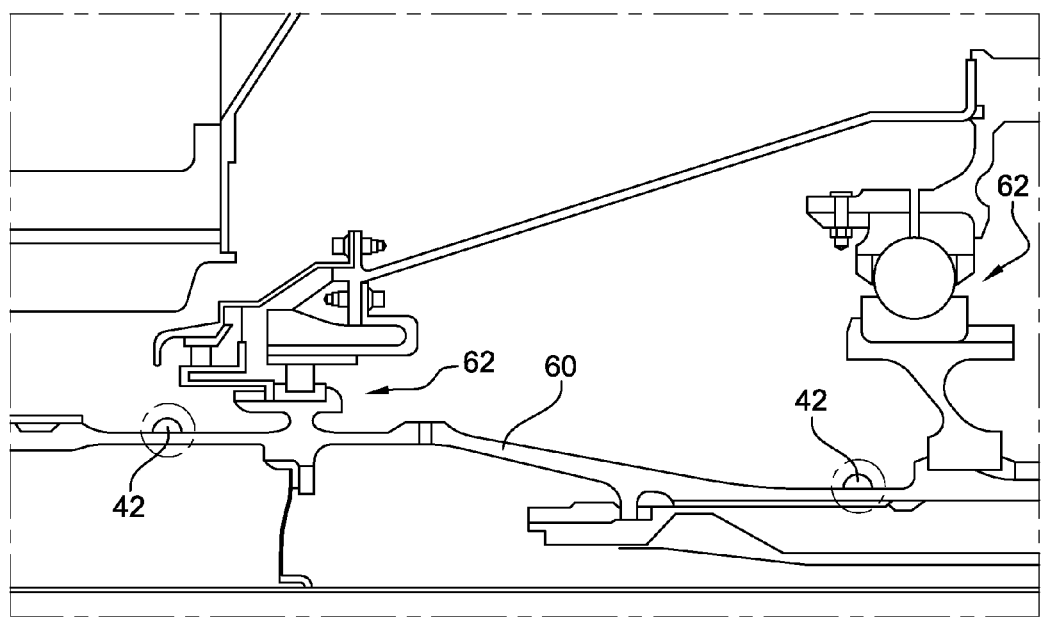

FIG. 2 shows an embodiment of the means which make it possible to equip a rotor with radioactive tracers, and FIGS. 3 and 4 show examples of areas for assembling these means on a low-pressure body of a turbine engine.

In the embodiment in FIG. 2, the rotor 40 is equipped with one or more rings 42 for supporting the radioactive tracers 44. Each ring 42 extends around the axis of rotation of the rotor 40 and is mounted on the rotor so as to be connected thereto for conjoint rotation. In this case, each ring 42 is of the two-material type and comprises an inner annular layer 46 and an outer annular layer 48.

The inner annular layer 46 of the ring 42 is mounted around the rotor 40 and is preferably made of elastically deformable material, such as silicone. Said layer has for example a thickness of approximately 1 mm. Said layer can be mounted on the rotor 40 by enlarging the diameter thereof, due to the elastic deformation capabilities thereof.

The outer annular layer 48 of the ring 42 is mounted around the rotor 40 and is intended to extend around the inner layer 46. The outer layer 48 is preferably made of metal. Said layer has for example a thickness of approximately 1 mm so that the total thickness of the ring 42 does not exceed approximately 2 mm.

The outer layer 48 is split or open at a point on the circumference thereof and comprises, in the region of this point, closure means 50, for example of the Colson® type. The inner layer 46 is shaped so as to define recesses 52 on the side of the internal diameter thereof for receiving the radioactive tracers 44. The recesses 52 comprise openings which are oriented radially towards the inside. The tracers 44 are thus mounted in said recesses before the outer layer 48 is mounted on the rotor 40. The recesses 52 have shapes and sizes which are close to those of the tracers 44. The recesses have for example a length of approximately a few millimeters, the outer layer 48 and the ring 42 also having a length of approximately a few millimeters.

The tracers 44 are regularly distributed around the axis of revolution of the ring 42. There are at least two and for example four tracers, as in the case shown.

The closure means 50 are located in the region of the free circumferential ends of the outer layer 48 and are intended to cooperate with one another to close the outer layer 48 and to firmly hold the outer layer on the inner layer 46. In the clamping position of the closure means 50, the inner layer 46 is preferably slightly compressed between the outer layer 48 and the rotor 40. The inner layer 46 makes it possible to prevent relative rotational movements between the rotor 40 and the outer layer 48 and also ensures that the tracers 44 are held in the recesses in the outer layer 48, the tracers 44 preferably being slightly constrained between the inner layer 46 and the bottom of the recesses 52 thereof in the assembled position, in order to limit the movements thereof during use.

The outer layer 48 of the ring 42 also has an oversized portion 54 which is diametrically opposite the closure means 50 and which is adapted so that the mass thereof is substantially identical to that of the closure means, in order to limit the risk of an imbalance appearing during the rotation of the rotor 40 which is equipped with the ring 42.

FIGS. 3 and 4 show examples of locating rings 42 for supporting radioactive tracers 44. In the case of FIG. 3, the rotor 40 of the LP compressor of a turbine engine is equipped with two rings 42 of the type shown in FIG. 2, said rings 42 each being mounted on an annular wall 56 of said rotor 40, said wall connecting two consecutive impellers 58. In the case of FIG. 4, the shaft 60 of the LP compressor (which connects the rotor of the LP compressor to the rotor of the LP turbine) is equipped with two rings 42 of the above-mentioned type, which are arranged in the vicinity of bearings 62 for guiding the shaft.

The invention claimed is:

1. Method for measuring the kinematics of at least one rotor of an engine, wherein the measurement is carried out by scintigraphy using gamma radiation, the method comprising:
   a) equipping the rotor with radioactive tracers, and
   b) during the operation of the engine, detecting the gamma radiation emitted by said tracers by at least two gamma cameras which are oriented substantially at 90° to one another.

2. Method according to claim 1, wherein in step a), the rotor is equipped with a ring for supporting a plurality of radioactive tracers, said ring extending around an axis of rotation of the rotor and being connected to the rotor for conjoint rotation.

3. Method according to claim 2, wherein the radioactive tracers of the ring or each ring are regularly distributed around said ring.

4. Method according to claim 2, wherein the ring comprises at least two radioactive tracers.

5. Method according to claim 2, wherein the ring comprises an outer annular layer made of metal and an inner annular layer made of elastically deformable material.

6. Method according to claim 5, wherein the outer annular layer is split or open at a point on the circumference thereof and comprises closure means in a region of free circumferential ends thereof.

7. Method according to claim 6, wherein the outer annular layer has an oversized portion which is diametrically opposite to the closure means.

8. Method according to claim 5, wherein the outer annular layer defines recesses for receiving the radioactive tracers.

9. Installation for implementing the method according to claim 1, comprising:
   means for supporting the engine;
   the at least two gamma cameras oriented substantially in planes which are substantially horizontal and vertical respectively; and
   the radioactive tracers which are mounted or intended to be mounted on a rotor of the engine.

10. Method according to claim 9, wherein the means for supporting the engine is a test rig.

11. Method according to claim 9, wherein the engine is a turbine engine.

12. Method according to claim 1, wherein the engine is a turbine engine.

\* \* \* \* \*